(12) United States Patent
Toft (10) Patent No.: US 8,424,582 B2
(45) Date of Patent: Apr. 23, 2013

(54) METHOD AND DEVICE FOR PRODUCING A PACKAGING MATERIAL

(75) Inventor: Nils Toft, Malmö (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 175 days.

(21) Appl. No.: 11/524,317

(22) Filed: Sep. 21, 2006

(65) Prior Publication Data

US 2007/0015647 A1 Jan. 18, 2007

Related U.S. Application Data (63) Continuation of application No. 10/433,436, filed as application No. PCT/SE01/02779 on Dec. 14, 2001, now abandoned.

(30) Foreign Application Priority Data

Dec. 18, 2000 (SE) ...................................... 0004709

(51) Int. Cl.
*B32B 37/10* (2006.01)
*B65H 27/00* (2006.01)

(52) U.S. Cl.
USPC ............... 156/555; 156/582; 492/30; 492/38; 492/40

(58) Field of Classification Search ................... 156/555, 156/582; 492/30, 38, 40
See application file for complete search history.

(56) References Cited

U.S. PATENT DOCUMENTS

| 2,287,768 | A |   | 6/1942 | Eckstein |  |
|---|---|---|---|---|---|
| 2,428,101 | A |   | 9/1946 | Splawn |  |
| 2,434,820 | A |   | 1/1948 | Tift |  |
| 2,793,585 | A | * | 5/1957 | Granitsas | ......................... 101/28 |
| 2,985,398 | A | * | 5/1961 | Rockstrom et al. | ........ 242/530.4 |
| 3,240,442 | A |   | 3/1966 | Kilmartin |  |
| 3,266,976 | A |   | 8/1966 | Brezinski |  |

(Continued)

FOREIGN PATENT DOCUMENTS

| EP | 575703 A1 | * | 12/1993 |
| EP | 05 92 920 A1 |  | 4/1994 |

(Continued)

OTHER PUBLICATIONS

Japan Patent Office. Japanese Patent Application No. 2002-551154. Office Action dated May 23, 2006. 4 pages.

(Continued)

*Primary Examiner* — Mark A Osele
(74) *Attorney, Agent, or Firm* — Buchanan Ingersoll & Rooney PC (57) ABSTRACT

Press roll for a laminating machine for producing a packaging material which comprises a carcass layer consisting of paper or carton, and which carcass layer exhibits crease lines, through holes, openings or slits, which carcass layer exhibits, on one of its sides, a barrier layer, a plastic lining which is arranged outside the barrier layer, and film of laminant thermoplast which is arranged between the carcass layer and the barrier layer, with the press roll exhibiting a circular-cylindrical jacket surface having a facing consisting of an elastic material. According to the invention, the facing comprises sections in the jacket surface, which sections exhibit local deformation ability in relation to the surrounding facing. The invention also relates to a method for producing packaging material and to packaging material which has been produced using this method.

8 Claims, 5 Drawing Sheets

U.S. PATENT DOCUMENTS

| | | | |
|---|---|---|---|
| 3,339,818 A | 9/1967 | Morrow | |
| 3,448,479 A | 6/1969 | Cademartori | |
| 3,526,000 A | 8/1970 | Williams | |
| 3,772,120 A * | 11/1973 | Radzins | 156/264 |
| 3,804,931 A | 4/1974 | Miller | |
| 3,893,795 A * | 7/1975 | Nauta | 425/403 |
| 3,961,012 A | 6/1976 | DiMaio | |
| 4,026,487 A | 5/1977 | Ales, Jr. | |
| 4,068,620 A * | 1/1978 | Peters | 118/249 |
| 4,110,152 A * | 8/1978 | Dunning et al. | 156/553 |
| 4,353,296 A | 10/1982 | Beucker | |
| 4,361,085 A * | 11/1982 | Schutz | 101/23 |
| 4,366,025 A | 12/1982 | Gordon, Jr. et al. | |
| 4,368,568 A * | 1/1983 | Watanabe | 492/52 |
| 4,558,725 A | 12/1985 | Veneziale | |
| 4,559,106 A | 12/1985 | Skytta et al. | |
| 4,566,162 A | 1/1986 | Brands | |
| 4,748,910 A | 6/1988 | Richter | |
| 4,994,130 A * | 2/1991 | Ichikawa et al. | 156/164 |
| 5,098,497 A | 3/1992 | Brinley | |
| 5,240,198 A | 8/1993 | Dorfel | |
| 5,575,436 A * | 11/1996 | McDermott | 242/542.4 |
| 5,582,568 A | 12/1996 | Lehtonen | |
| 5,803,398 A | 9/1998 | May et al. | |
| 5,967,450 A * | 10/1999 | May et al. | 242/547 |
| 6,007,468 A * | 12/1999 | Giacometti | 493/341 |
| 6,036,803 A | 3/2000 | Lasson et al. | |
| 6,039,840 A | 3/2000 | Kytönen et al. | |
| 6,056,230 A | 5/2000 | Peters et al. | |
| 6,287,033 B1 * | 9/2001 | Hatakeyama et al. | 400/636 |
| RE37,657 E | 4/2002 | Lucas | |
| 6,435,246 B1 | 8/2002 | Kerr | |
| 6,444,075 B1 | 9/2002 | Schneider et al. | |
| 6,684,447 B2 | 2/2004 | Mihara et al. | |
| 6,739,024 B1 * | 5/2004 | Wagner | 28/106 |
| 2002/0157772 A1 * | 10/2002 | Enlow et al. | 156/238 |

FOREIGN PATENT DOCUMENTS

| | | |
|---|---|---|
| JP | 6-263297 A | 9/1900 |
| JP | 6-39940 A | 2/1994 |
| JP | 6-226851 A | 8/1994 |
| JP | 7-267451 A | 10/1995 |
| JP | 07267451 A | 10/1995 |
| JP | 3022119 U | 12/1995 |
| JP | 9-104423 A | 4/1997 |
| JP | 11-507317 A | 6/1999 |
| JP | 11-235747 A | 8/1999 |
| WO | WO 0034562 A1 * | 6/2000 |
| WO | 00/48333 | 8/2000 |

OTHER PUBLICATIONS

Swedish Patent Office. National Application No. 0004709-2. PCT International -Type Search Report. International Application No. PCT/SE00/01552. Applicant, Tetra Laval Holdings & Finance S.A. Sep. 26, 2001. 3 pages.

* cited by examiner

METHOD AND DEVICE FOR PRODUCING A PACKAGING MATERIAL

CROSS REFERENCE TO RELATED APPLICATIONS

This application is a Continuation of co-pending U.S. application Ser. No. 10/433,436, filed on Jun. 4, 2003 by Nils Toft, the entire content of which is incorporated by reference, and for which priority is claimed under 35 U.S.C. §120. U.S. application Ser. No. 10/433,436 is a U.S. National Phase Application of PCT/SE01/02779. Priority is also claimed under 35 U.S.C. §119 to corresponding Swedish Patent Application No. 0004709-2 filed on Dec. 18, 2000.

FIELD OF THE INVENTION

The present invention relates to a method for producing packaging material which is in the form of a continuous laminate web and is of the type which comprises a carcass layer made of paper or carton, one side of which exhibits a layer which is arranged outside the carcass layer and which comprises, on the one hand, a barrier layer and, on the other hand, a plastic lining which is arranged outside the barrier layer and which comprises one or more thermoplastic materials, with the carcass layer being covered by the said layer along the whole of its surface while the layer, along selected parts, extends beyond the edges of the carcass layer. In the present instance, a barrier layer means a layer which first and foremost constitutes a barrier to oxygen. A preferred layer consists of a metal foil layer, preferably an aluminum foil layer.

BACKGROUND OF THE INVENTION

Disposable packaging containers, particularly those for storing liquids, are frequently produced from a packaging material which consists of a carcass layer of paper, which layer is covered with thermoplastic materials and aluminum foil. The packaging material is frequently supplied in the form of webs which are reeled on storage reels and which, after having been unrolled from their storage reel, are converted, by means of folding, into packaging containers in automatic packaging machines. A commonly occurring packaging of this type is that which is marketed under the trade name TETRA BRIK and which is preferably used for liquid filling material of the milk, fruit juice, etc. type.

This packaging container is produced in automatic packaging and filling machines in such a way that the web which is unrolled from the storage reel is transformed into a tube by the edges of the web being joined in an overlap seam, after which the tube which has been formed is filled with the intended filling material and subdivided into individual packaging containers by means of repeated transverse seals, which are arranged at a distance from each other and at right angles to the tube. After the filling material which has been supplied has been enclosed in this way in sealed-off parts of the tube, these parts are separated from the tube by means of cuts made in the said transverse sealing zones. The subdivided tube parts are then shaped, by means of folding along crease lines which are arranged in the packaging material, to form packaging containers of the desired shape, for example a parallelepiped shape.

Packagings of this type are frequently provided with opening notches in the form of holes, openings or slits which are made in the packaging material and which are covered with strips which can be torn off and which are normally termed "pull-tabs". Alternatively the packaging device is provided with an external opening device, for example in the form of a plastic pouring spout having a screw top for resealing, which opening device is only allowed to penetrate the packaging laminate in connection with the packaging being opened and the product being used. In this connection, the packaging laminate is provided with an opening which consists of a punched-out hole in the carcass layer, over which hole aluminum foil and thermoplastic layers have been laminated. Thus, when the filling material consists of a sterile product, such as sterilized milk, or an acidic product, such as orange juice, the packaging container is frequently manufactured from a packaging laminate comprising an aluminum foil layer which makes the packaging extremely impervious to the penetration of gases, such as oxygen, which can oxidize the contents and impair its quality. In order to achieve the desired imperviousness, it is very important that the aluminum foil layer is not broken or damaged during the shaping of the packaging or when the packaging material is being manufactured and, for the function of the tear strip opening (the pull tab) or the penetrating opening device, it is of importance that the aluminum foil layer adheres extremely well to the area around the opening holes since otherwise the opening operation can easily fail. Thus when a covering strip has been affixed over the intended opening, this strip can be torn off in connection with this operation, without, for all that, the inner lining of plastic and aluminum foil being torn open. When a penetrating opening device is used, this opening device can fail to make a clean cut in the aluminum foil and thermoplastic layer, resulting in frayed edges.

An object of the invention is, in a simple and effective manner, to treat and prepare a packaging material web of the abovementioned type such that the edge of the packaging material web is effectively sealed off using an upper plastic film or a plastic film which is arranged around the edge zone. It is known to seal off liquid-absorbing material edges, which are exposed to the inside of a packaging container, with bridging thermoplastic strips or thermoplastic strips which are folded around the edges. It is also known, for the same purpose, to provide the packaging material web with what is termed a fixed plastic edge strip, i.e. with a plastic strip which projects from the edge of a carton web and which can be folded around the edge and sealed to its opposite side. Such a "fixed edge strip" is obtained by arranging carton webs alongside each other, such that they form a slit or gap between each other, after which the webs and the slits are jointly covered with a plastic foil or, in certain cases, with a plastic foil and an aluminum foil, after which the covered webs are separated by means of a cut made in the slit region, thereby forming a projecting, fixed strip. A drawback has hitherto been that it is not possible to obtain adherence, or it is at all events a poor adherence which is obtained, between, for example, an aluminum foil layer and a plastic layer in the region of the slits since the aluminum foil and the plastic layer cannot be pressed together within the region of the cut and, in particular, not right up to the boundary edges of the slits due to the varying thickness of the material and the resulting difficulty for the pressure rolls to compress the material within the slit region.

Packaging material of the type which is meant here can be produced by means of known technology, by applying the different layers, i.e. the aluminum foil layer, the inner plastic layer, etc., in several separate lamination operations, to the carcass layer consisting of paper or carton, and such a lamination procedure works very well when the carcass layer is not provided with holes, openings or slits, i.e. regions where the covering layers extend beyond or past edge zones of the carcass layer. It has been found that, when an aluminum foil is being layered onto a carcass layer web consisting of paper or carton, where the carcass layer is provided with holes, openings or slits, difficulties arise due to the fact that, in connection with the lamination, where the binding laminating layer frequently consists of a thin extruded thermoplastic film, the aluminum foil has to be pressed against the carcass layer base using an press roll or soft pressure roll in order to achieve sufficient adherence between the aluminum foil layer and the carcass layer. Since the aluminum foil layer is as a rule very thin (from approx. 5 to 10 μm), it comes to be pressed, by the press roll, against the edges around the opening or the slits in the carcass layer and partially pressed into the said holes or openings. Since the perforations have a relatively sharp edge, there is a risk of the aluminum foil rupturing and, at all events, the risk arises of the aluminum foil becoming creased around the edges of the openings or the slits and, as a result, either being weakened or achieving poor adherence with the carcass layer precisely in the edge zones of the holes or openings. Furthermore, the adherence between the plastic layer and the aluminum foil layer is poor in the region of the said holes or slits since the pressure of the press roll in the said regions is limited due to the reduction in the thickness of the material in the said holes or slits.

The abovementioned circumstances have constituted a severe problem which has firstly caused ruptures in the aluminum foil layer, and consequently caused the gas-tightness of the packagings to be inadequate, secondly caused the opening function to be defective due to poor adherence between the aluminum foil layer and the carcass layer in the edge zones around the openings and thirdly caused poor adherence between the aluminum foil layer and the plastic layer along the parts where the aluminum foil layer and the plastic layer project outside the carcass layer and are consequently not supported by this layer when being pressed together.

The adherence between the aluminum foil layer and the film of laminant thermoplast which binds the aluminum foil layer to the carcass layer, and the adherence between the aluminum foil layer and the plastic lining which is arranged outside this layer (i.e. the plastic lining which comes to be in direct contact with the liquid which is to be stored in the finished packaging) are especially critical. In the region of the said holes or slits, this adherence is frequently poor since the material exhibits a reduction in thickness in the holes or slits, which reduction in thickness results in the pressure of the press nip being lower at these sites. In other words, the reduction in thickness means that the press nip, comprising an press roll and a cooled roll, is unable to press the aluminum foil layer and the different polymer layers together sufficiently for achieving the requisite adherence in essentially the whole of the region defined by the hole or the slit, particularly in the vicinity of the hole edges. This is expressed as air inclusions adjacent to the edges of the hole or slit, which in turn means that problems of fracture formation in the aluminum foil arise, leading to impaired gas-tightness and consequently problems with asepsis. The air inclusions also result in it being difficult to tear off or penetrate the membrane consisting of the aluminum foil and the polymeric films in the hole/slit, with the ability to open the packaging being restricted and/or with it not being possible to make a clean cut when penetrating, resulting in the formation of frayed edges.

The difficulty of solving the problem of poor pressure in the press nip in the region of the holes/slits is aggravated by the fact that it is at the same time necessary, in the press nip, to pay regard to optimization aspects in relation to the adherence between the aluminum foil and the different polymer layers in the regions outside the regions of the holes/slits. The polymeric layer which is to be laminated to the aluminum foil is extruded in molten or semi-molten form directly into the press nip and has to be pressed together by the nip before the temperature of the polymeric material falls too much, in connection with which the material solidifies. This means that the line load in the nip is only effective for laminating during the course of a first, relatively short, press nip length. A press nip length which exceeds this effective press nip length only means that the line load is distributed over a greater area, something which is a disadvantage since the pressure in the press nip then becomes lower. For this reason, conventional press rolls are manufactured with a homogeneous surface facing of relatively high hardness, normally greater than 80-90 Shore A, giving a short press nip length. However, this relatively hard, homogeneous surface facing results in the adherence in the regions of the holes/slits being poor, as previously discussed.

Another problem in connection with laminating a polymer film to a carcass layer consisting of paper or carton, which carcass layer exhibits through holes, openings or slits, is that the polymeric material tends to accumulate in connection with these holes, openings or slits.

Problems with adherence between the different layers in the laminate can also arise in association with crease lines in the carcass layer consisting of paper or carton, with these problems being similar to those when holes, openings or slits are present.

SUMMARY OF THE INVENTION

The present invention aims to tackle the above complex of problems. In particular, the invention aims to offer an press roll which provides, in the hole regions or crease line regions of the carcass layer, improved adherence between the aluminum foil layer and one or more polymer layers which abut it, for example a plastic lining consisting of one or more thermoplastic materials and/or a film consisting of a laminant thermoplast, which layer(s) is/are extruded directly into a press nip which comprises the press roll in accordance with the invention. In this connection, the aim is that it should be possible to produce a press nip having an advantageously short press nip length and optimized line load at the same time as good adherence is achieved in the regions of the holes. Even in association with high line speeds, high line loads and short press nip lengths, the press roll according to the invention should be arranged such that it has time to penetrate into the hole regions or crease lines to laminate together the films and layers which are present at these locations.

These aims are achieved when use is made of the press roll according to the invention as defined in Claim 1.

The invention also relates to a method for producing a packaging material using the press roll according to the invention and to a packaging material which has been produced using the method.

The press roll comprises a metal core having a circular-cylindrical jacket surface, which jacket surface is faced with a facing consisting of an elastic material. According to the invention, the facing comprises sections which are located in the jacket surface and exhibit local deformation ability in relation to the surrounding facing. In this present instance, the expression "local deformation ability" means that a deformation within such a section is only propagated to the facing material outside of the section in question to a very limited extent as compared with the deformation spreading which takes place in an entirely homogeneous jacket material.

According to a preferred embodiment of the invention, the sections possessing local deformation ability are arranged in a large number, with what is mainly a uniform distribution over the whole of the jacket surface.

According to an alternative embodiment, the sections possessing local deformation ability are arranged as, or in, one or more regions which extend as cylindrical segments around the circumference of the roll in positions which correspond to the holes, the openings, the slits or the crease lines in the carcass layer of the packaging material. In this connection, each such segment can, in accordance with a first variant of this embodiment, constitute a homogeneous section having local deformation ability, with the said sections/segments being fashioned from a first elastic, polymeric material exhibiting a first damping and a first E-module, and with the surrounding facing being fashioned from a second elastic, polymeric material exhibiting a second damping and a second E-module, such that the said first damping and said first E-module are lower than the said second damping and said second E-module, respectively. Alternatively, according to another variant of the embodiment, each such segment around the circumference of the roll can comprise a large number of sections having local deformation ability and being distributed mainly uniformly over the whole of each respective segment.

As a result of the sections having local deformation ability, a desired penetration into the hole regions or crease line regions in the carcass layer is achieved when the carcass layer, the aluminum foil and the polymeric layer(s) pass through the press nip at the same time as a desired pressure can be maintained in the press nip, with the line load being retained, in the regions outside of the hole regions or crease line regions.

BRIEF DESCRIPTION OF THE DRAWINGS

The invention will be described in more detail below while referring to the figures, of which:

FIGS. 7*a-m* show different variants of patterns in the facing, which patterns provide location deformation ability in the jacket surface.

DETAILED DESCRIPTION OF THE INVENTION

Figure 1:
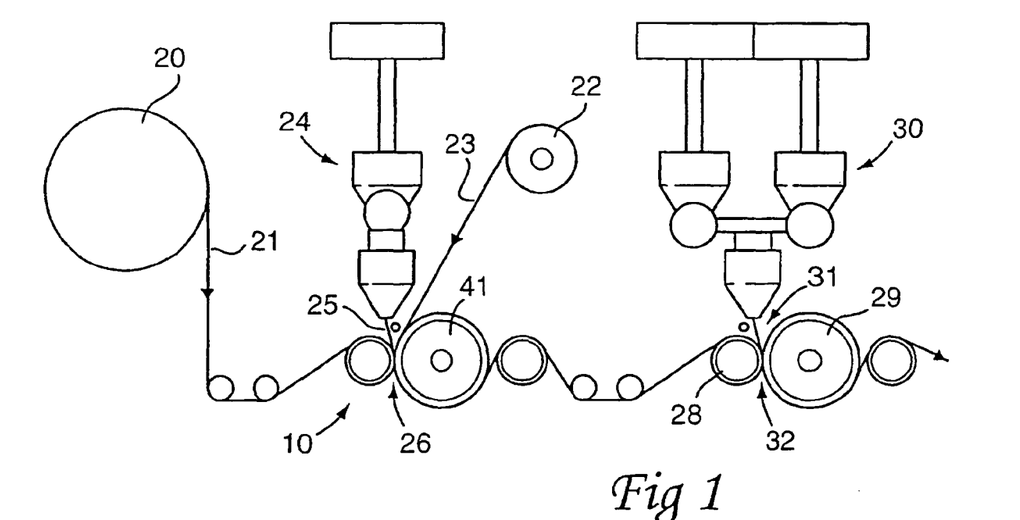
FIG. 1 shows a diagram of a line for laminating packaging material, which line comprises two press nips at least one of which uses an press roll in accordance with the invention.

The line for producing a packaging laminate of the type which is referred to here, which line is shown diagrammatically in FIG. 1, comprises a storage reel 20 containing a web 21 of fibre material, i.e. paper or carton, which, on one of its sides, can exhibit a thin coating of a thermoplastic material, for example polyethylene. A storage reel containing a thin aluminum foil web 23 (5-20 μm) is designated 22 and an extruder for forming a film of molten laminant thermoplast 25 (preferably polyethylene) is designated 24. A press roll 10, in accordance with the invention, interacts, in a press nip 26, with a cooling counter roll 41 having a steel surface in the laminating machine which is formed from these elements and also the extruder 24. From this first laminating machine 10, 41, 24, the packaging laminate, which is now semifinished, proceeds onwards to a second laminating machine which comprises a press nip 32, having a press roll 28 and a cooling counter roll 29, and an extruder 30, which can be arranged to co-extrude a double-sided film 31 consisting of two different thermoplastic materials. In the second laminating machine 28, 29, 30, the semifinished packaging laminate which comes from the first laminating machine 10, 41, 24 is laminated together with this double-sided film 31 on that side of the laminate which exhibits the aluminum foil. The double-sided film can, for example, comprise ethylene acrylic acid ester, EAA, which is laminated closest to the aluminum foil, and low density polyethylene, LDPE, on the outside of this. During operation of the lamination line which is shown in FIG. 1, the press roll 10 typically has a peripheral speed of up to 800 m/min, preferably 300-700 m/min, and even more preferably 400-700 m/min. The line load in the press nip 26 is typically 20-60 N/mm, preferably 20-50 N/mm, and the press nip length is at least 20 mm, preferably 20-35 mm, and even more preferably 20-30 mm. That which takes place in the press nip 26 as a result of the invention will be described in more detail in connection with FIGS. 3-8.

Figure 1A:
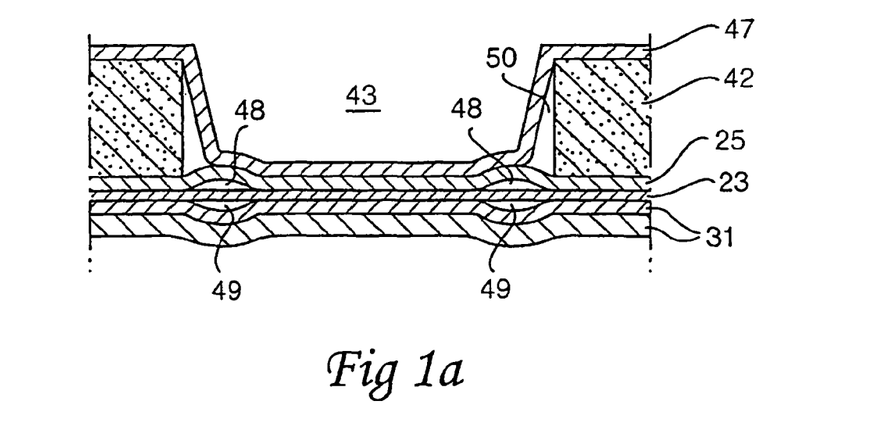
FIG. 1*a* shows a packaging material which results from the line in FIG. 1, as seen in cross section.

FIG. 1*a* shows the resulting packaging laminate from the line in FIG. 1 as seen in cross section. The carcass layer 42 plus its initial coating layer (decor) 47 correspond to the web 21 in FIG. 1. The designations of the remaining layers are the same as for the webs/films which are shown in FIG. 1. FIG. 1*a* also illustrates the problem of air inclusions 48, 49, 50 in the packaging laminate, which air inclusions can be decreased using the present invention. The air inclusions 48, 49 on either side of the aluminum layer 23 are most critical for the function of the laminate and are those which the invention is principally intended to decrease.

Figure 2:
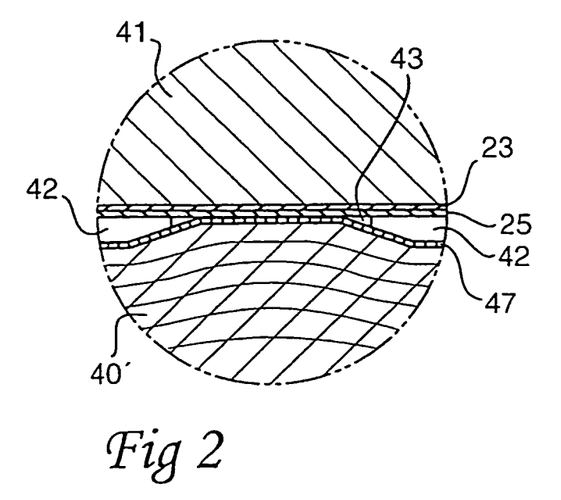
FIG. 2 shows a section through the facing layer of an press roll according to the prior art, at a press nip against a cooling roll, with a packaging material having a hole in the carcass layer being located in the press nip.

FIG. 2 shows a section through a facing layer 40' of a press roll in accordance with the prior art, at a press nip against a cooling roll 41, with a packaging material 42 having a hole 43 in the carcass layer being located in the press nip. The carcass layer 42, and consequently the side walls of the hole 43, typically exhibit a height (thickness) of about 0.2-0.5 mm. The hole 43 in the carcass layer can have any selected form whatsoever and normally exhibits a largest dimension (diameter or length) of at least about 10 mm and at most about 30 mm; however, it is also possible to conceive of smaller holes, for example for drinking straws. As can be seen, problems arise in the region of the hole 43 due to the fact that the facing layer 40', which is homogeneous and of a relatively high degree of hardness, is unable to be deformed locally around the edges of the hole. The facing of the press roll is therefore unable to satisfactorily penetrate down in the hole region in order to achieve perfect adherence between the different laminate layers which are present in this region, thereby leading to the problems which have been described above.

Figure 3:
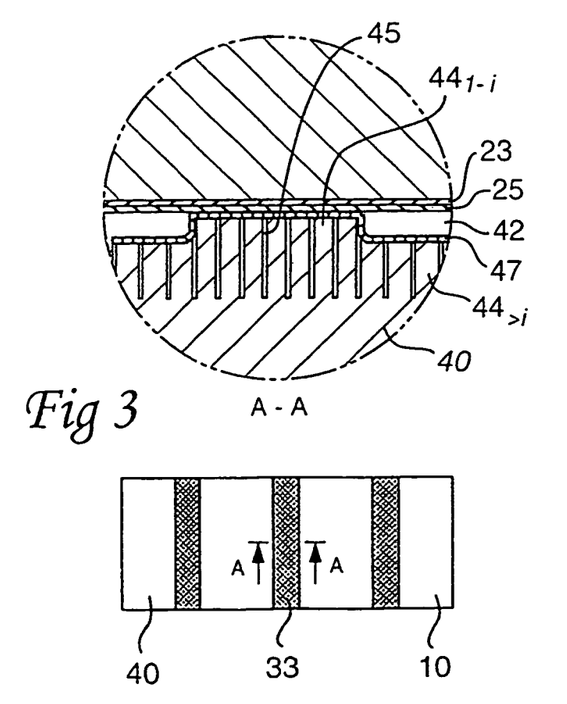
FIG. 3 shows an press roll in accordance with a first, preferred embodiment of the invention as seen from the side, and also a section of the facing of this roll at a press nip against a cooling roll, with a packaging material having a hole in the carcass layer being located in the press nip.

FIG. 3 shows a preferred press roll according to the invention, which roll is generally designated by 10. This roll typically exhibits an outer diameter of about 200-450 mm, in connection with which it should, however, be understood that the invention is not restricted to such diameters. While the core of the roll consists of a solid metal core, usually made of steel, it is naturally also possible to conceive of this core not being of a solid design. A facing 40 consisting of an elastic material (seen in the section) is arranged on the circular-cylindrical jacket surface of the core. This facing 40 comprises sections 44 possessing local deformation ability, in accordance with the invention. More specifically, these sections 44 possessing local deformation ability are formed by a pattern in the jacket surface of the press roll 10, i.e. in the outer part of its facing 40 but not right down to the core of the roll. In this connection, each section 44 consists of a unit which is free standing/delimited from the remainder of the facing material.

In the press nip, a certain number of sections/units $44_{1-i}$, namely as many as correspond to the area of the hole 43, can penetrate down in the hole 43 in order, in the hole, to produce a pressure on the different lining layers of the packaging laminate, against the cooling roll 41, which lining layers extend over the hole 43 in the carcass layer 42 of the packaging laminate. The sections/units $44_{>i}$ which are located outside the area of the hole 43 are able, instead, to be deformed locally such that a desired line load is achieved over the remaining areas of the packaging laminate. Between the sections 44, there are spaces 45 (shown clearly in FIG. 7) in which a void is present. Alternatively, the spaces 45 are filled with a compatible material, for example foamed rubber, which provides good adhesion to the sections possessing local deformation ability. This filler material expediently exhibits a lower E module and damping than the material of which the sections consist. Advantages of the spaces 45 being filled with a filler material are that the risk of damage to the free standing sections is decreased and that it becomes easier to remove any molten thermoplast which has happened to end up on the jacket surface after possible mishaps in the production.

In FIG. 3, the sections 44 are arranged in areas 33 which consist of cylindrical segments around the circumference of the roll, with the positions of the areas 33 corresponding to the positions of the holes in the carcass layer of the packaging laminate when the carcass layer runs over the roll. However, it is also very definitely possible to conceive of the sections 44 covering the whole, or essentially the whole, of the jacket surface with an essentially uniform distribution (not shown).

As a result of the jacket surface being profiled in this way, "deformation space" is created very locally. When the facing of the roll is deformed locally, the deformation will not be propagated in the same way as in a conventional, homogeneous jacket facing but, instead, be restricted locally due to the voids between the sections being filled by surrounding deformed sections or due to the filler material between the sections being compressed and breaking the force of the deformation of the sections. For this reason, it is possible to create large deformations very locally in the jacket facing without the surrounding contact surface being more than marginally affected.

Figures 4, 5, 6:
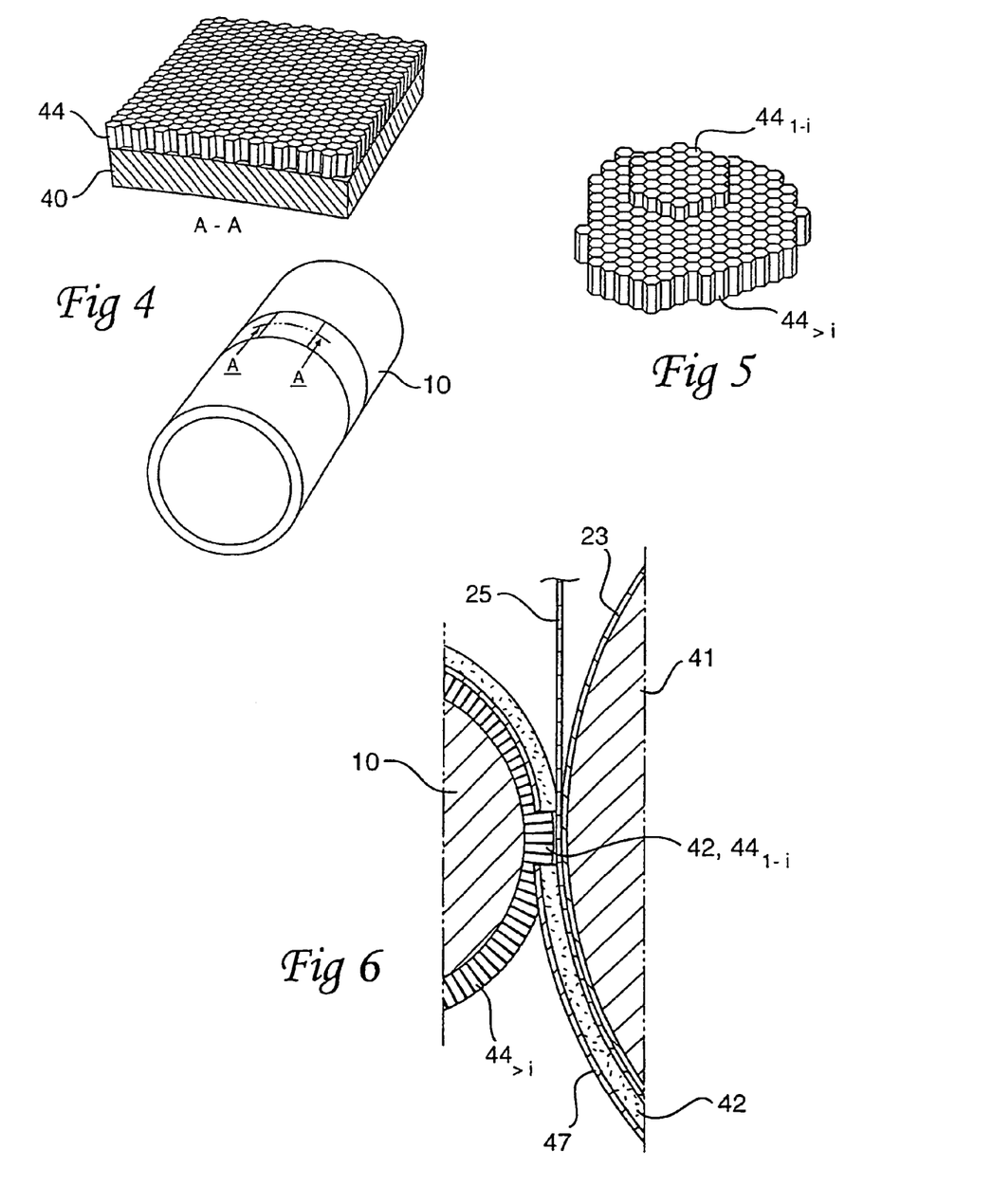
FIG. 4 shows the press roll according to FIG. 3 as seen in perspective and with an enlargement of a region of the facing of the roll.
FIG. 5 shows, in perspective, how a majority of the sections possessing deformation ability in FIG. 4 are able to be deformed locally at the same time as a smaller fraction of these sections resists deformation.
FIG. 6 shows the same principle as in FIG. 5, as seen in a transverse section through an press roll in abutment against a cooling roll, in a press nip through which a packaging material having a hole in the carcass layer is passing.
Figure 7:
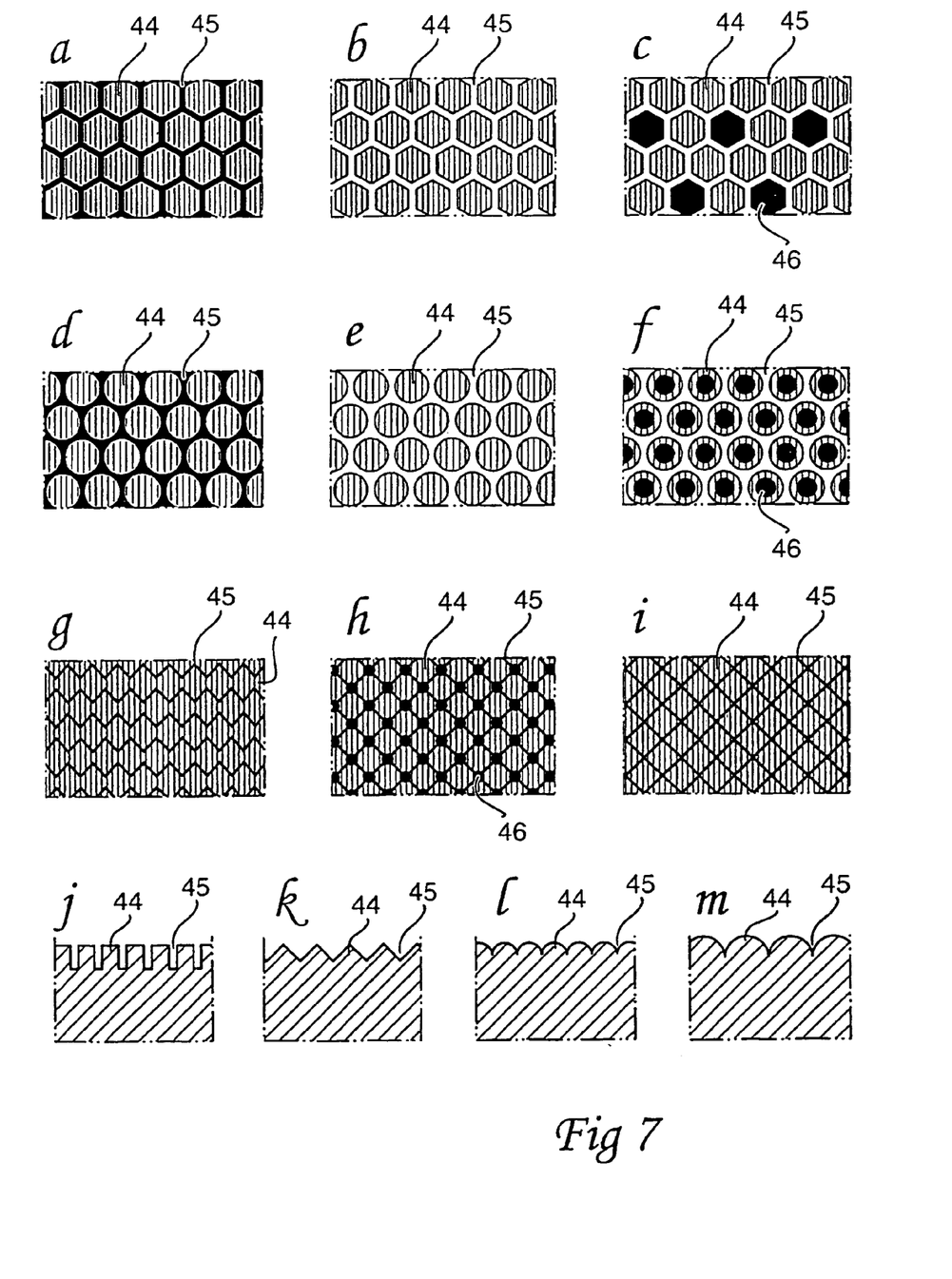

FIG. 4 shows a press roll in accordance with FIG. 3 together with a magnified part of the facing material. FIG. 5 illustrates how a group of free standing sections $44_{1-i}$ is able, in association with a notional, but not shown, hole in the carcass layer 42 of the packaging laminate, to resist the deformation to which the surrounding sections $44_{>i}$ in the facing are subjected. FIG. 6 illustrates how the sections $44_{>i}$ are deformed in the areas around a hole 43 in the packaging laminate while the sections $44_{1-i}$ in the area of the hole 43 resist deformation, as seen in a cross section through the press nip between the press roll 10 and the cooling roll 41.

FIGS. 7a-m show a number of different conceivable patterns in which the sections 44 are arranged. FIGS. 7a-c illustrate how the sections can exhibit hexagonal cross sectional profiles, with the spaces 45 between the sections in FIG. 7a consisting of voids while the corresponding spaces in FIG. 7b are filled with a compressible material. FIG. 7c shows how the facing can comprise through holes 46 which preferably extend right down to the core of the roll, which core is then expediently at negative pressure. FIGS. 7d-f show corresponding types of sections, with or without filler material and through holes, where the sections exhibit circular cross sectional profiles. FIGS. 7g-h show how the sections 44 can be arranged in a wave or zigzag pattern (with through holes 46 in FIG. 7h), it being possible for the spaces 45 between sections 44 to consist of voids or be filled with a filler material. The same applies, in a corresponding manner, to the design in FIG. 7i, which design corresponds to the cross section shown in FIG. 7j and shows a diamond pattern in which the sections 44 exhibit quadrangular cross sectional profiles. It is possible to conceive of other alternative patterns, for example with the sections consisting of elevated hemispheres, as is illustrated in the cross sections shown in FIGS. 7l and 7m, or pyramids, as is illustrated in the cross section in FIG. 7k. It will be understood that it is also possible to conceive of using a number of geometries which are similar to those shown.

According to one aspect of the invention, the said sections 44 are arranged in a number amounting to 0.5-20 per cm, preferably 1-10 per cm, and even more preferably 3-6 per cm, in at least one extension direction in the jacket surface. Furthermore, the geometry should be such that an aggregate volume $V_{se}$ of the sections 44 is related to an aggregate volume $V_{sp}$ of the said spaces 45 between the sections such that $0.3*V_{sp}<V_{se}<10*V_{sp}$, preferably $0.5*V_{sp}<V_{se}<7*V_{sp}$, and even more preferably $V_{sp}<V_{se}<5*V_{sp}$. In this connection, any through holes 46 are not included in the volume $V_{sp}$ of the spaces 45. In addition, a maximal height H of one of the said sections 44 should be related to a distance L such that $0.2*L<H<3*L$, preferably $0.3*L<H<2*L$, and, even more preferably $0.5*L<H<1.5*L$, where L is the shortest distance between the bottoms of two spaces 45 on each respective side of the said section 44.

The advantage of also having through holes 46 in the facing 40 is that this creates an additional expansion space for the sections 44 when the latter are deformed. If the core of the roll is additionally under negative pressure and the through holes 46 extend right down in the core, this then achieves an improved deaeration of the packaging laminate, thereby preventing or decreasing air inclusions in the laminate.

Figure 8:
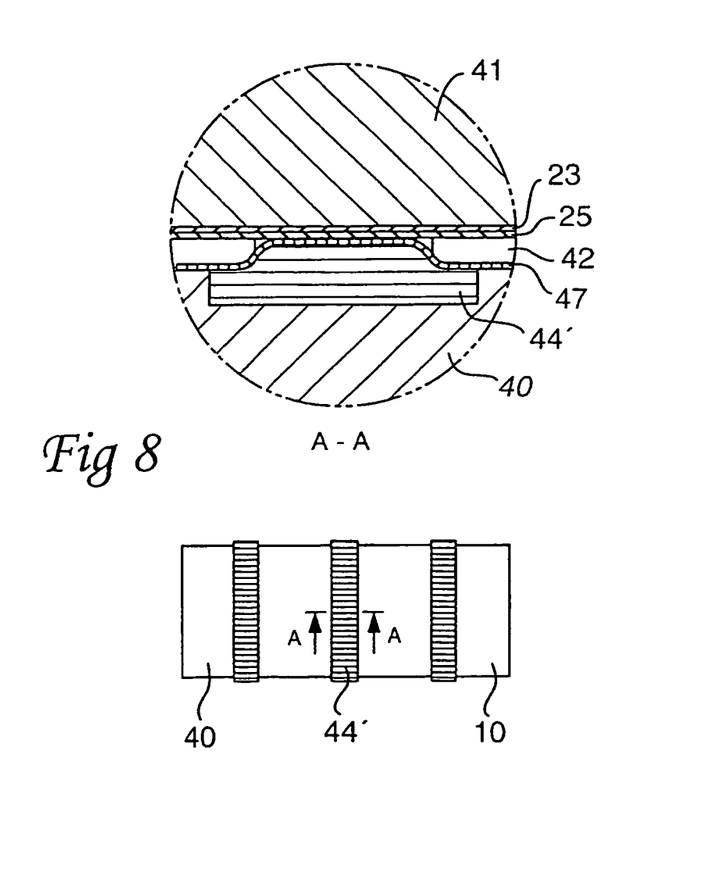
FIG. 8 shows an press roll in accordance with a second embodiment of the invention, as seen from the side, and a section of the facing of this roll, at a press nip against a cooling roll, with a packaging material having a hole in the carcass layer being located in the press nip.

FIG. 8 shows yet another alternative embodiment of the invention in which each locally deformable section 44' consists of an area or segment which is essentially homogeneous both in a direction around the circumference of the roll 10 and in an axial direction of the jacket surface, preferably extending 3-15 cm in the axial direction. These sections 44' are made up of a first elastic, polymeric material exhibiting a first damping and a first E module whereas the surrounding facing 40 is made up of a second elastic, polymeric material exhibiting a second damping and a second E module, with the said first damping and the said first E module being lower than the said second damping and the said second E module, respectively. Preference is given to the sections 44, consisting of insertions in the facing 40, which insertions exhibit a thickness Which constitutes 5-25%, preferably 7-20%, and even more preferably 8-15%, of an aggregate thickness of the insertions 44' plus the facing 40, with the roll 10 preferably exhibiting, at these sections 44', a diameter which is greater than a diameter in association with the surrounding facing, meaning that the section 44' projects a short distance outside the surrounding jacket surface.

In addition to the improved ability of the press roll to penetrate down in holes, slits, openings or crease lines in the packaging laminate, an advantage of the invention is that the nip force can be lowered in relation to a conventional press roll for the purpose of achieving the requisite contact surface and local deformation. An advantage of arranging the locally deformable sections in segments is that a high local deformation is achieved where this is required at the same time as the rigidity of the conventional press roll is otherwise retained. This means that, while the nip pressure is high in general, it is locally lower in association with the holes in the packaging laminate, where the deformation is greater instead.

The invention is not limited by the above-described preferred embodiments. Thus, it should be understood, for example, that the press roll according to the invention can equally well be used as the press roll 28 in the second laminating machine in FIG. 11 in connection with which the press roll in the first laminating machine can be of the type according to the invention or of a conventional type. It should also be understood that the press roll according to the invention can also be used in lamination lines in which the order in which the different layers of the packaging laminate are laminated together is different. In brief, it can be used when laminating packaging laminates which possess holes, slits, openings or crease lines in the carcass layer irrespective of the type of lamination line and irrespective of the order in which the different layers in the laminate are laminated together.

What is claimed is:

1. A laminating machine for producing packaging in web form, the machine comprising:
    a storage reel, and a web of fiber material on the storage reel, the web of fiber material on the storage reel comprising through holes, opening or slits;
    an extruder that extrudes a molten thermoplast; and
    a press roll and a counter roll, the press roll being positioned to press against the counter roll to form a press nip with the counter roll into which the web of fiber material and the molten thermoplast are brought together and pressed together, the press roll comprising:
       a metal core;
       a facing on the metal core, the facing possessing an outer surface and being comprised of at least one section;
       wherein the section extends over the entire circumference of the outer surface and exhibits local deformation ability in relation to an axially adjacent portion of the facing which is axially adjacent the section; and
       wherein the section is made up of a first elastic, polymeric material exhibiting a first damping and a first E modulus, and wherein the axially adjacent portion of the facing is made up of a second elastic, polymeric material exhibiting a second damping and a second E modulus, with the first damping and the first E modulus being lower than the second damping and the second E modulus, respectively.

2. The laminating machine according to claim 1, wherein the section defines a cylindrical segment that extends around a circumference of the press roll.

3. The laminating machine according to claim 2, wherein the section is essentially homogeneous in a direction around the circumference of the press roll and in an axial direction of the outer surface and has an extension of 3-15 cm in the axial direction.

4. The laminating machine according to claim 3, wherein the at least one section includes a plurality sections each of which is an insertion in the facing and each of which possesses a thickness that constitutes 5-25% of an aggregate thickness of the insertions plus the facing, with the press roll exhibiting, at each insertion, a diameter which is greater than a diameter of the adjacent portion of the facing which is devoid of the insertion.

5. The laminating machine according to claim 3, wherein the at least one section includes a plurality sections each of which is an insertion in the facing and each of which possesses a thickness that constitutes 7-20% of an aggregate thickness of the insertions plus the facing, with the press roll exhibiting, at each insertion, a diameter which is greater than a diameter of the adjacent portion of the facing which is devoid of the insertion.

6. The laminating machine according to claim 5, wherein the facing comprises through holes which extend from the outer surface to the metal core, and the press roll comprises means for creating a negative pressure in the metal core.

7. The laminating machine according to claim 1, wherein the storage reel is a first storage reel,
    the laminating machine further comprises a second storage reel, with a wound barrier layer located on the second storage reel, the second storage reel being positioned to supply the barrier layer from the second storage reel to the press nip,
    the first storage reel is positioned to supply the web of fiber material to the press nip, and
    the extruder is positioned to deliver the molten laminant thermoplast between the web of fiber material and the barrier layer as the web of fiber material and the barrier layer are led into the nip.

8. The laminating machine according to claim 1, wherein the counter roll is a cooling roll.

* * * * *